Sept. 23, 1969 G. A. REESE ET AL 3,469,027

FACSIMILE TRANSCEIVER

Filed Oct. 8, 1965 3 Sheets-Sheet 1

INVENTORS:
Glen A. Reese
Gustavus B. Pearson

By Smyth, Roston & Pavitt
Attorneys

Sept. 23, 1969 G. A. REESE ET AL 3,469,027

FACSIMILE TRANSCEIVER

Filed Oct. 8, 1965 3 Sheets-Sheet 2

INVENTORS:
Glen A. Reese
Gustavus B. Pearson

By Smyth, Roston & Pavitt
Attorneys

INVENTORS:
Glen A. Reese
Gustavus B. Pearson
By Smyth, Roston & Pavitt
Attorneys United States Patent Office 3,469,027

Patented Sept. 23, 1969

3,469,027

FACSIMILE TRANSCEIVER

Glenn A. Reese, San Pedro, and Gustavus B. Pearson, Los Angeles, Calif., assignors to The Magnavox Company, Torrance, Calif., a corporation of Delaware Filed Oct. 8, 1965, Ser. No. 494,053
Int. Cl. H04n 3/16, 5/38, 7/00
U.S. Cl. 178—6 11 Claims

ABSTRACT OF THE DISCLOSURE

This invention relates to apparatus for providing a transducing action between the recording of information on copy paper and the reproduction of information from the copy paper. The apparatus includes an arcuate platen mounted on a particular axis and transducing means, including a stylus, rotatable on the particular axis. The copy paper is disposed on the platen and a flexible paper holder is also disposed on the platen for forcing the copy paper to conform to the shape of the platen. Means are provided for maintaining the stylus in a uniform relationship to the copy paper as the transducing means are rotated. Means are also provided for moving the transducing means between a first position in operative relationship to the platen and a second position displaced from the platen to provide for access to the platen in the second position. Drive roller means extend through the platen and cooperate with pressure roller means to compress the copy paper and move the copy paper in an axial direction.

The present invention relates to facsimile systems and more particularly to a transceiver which may be used in a facsimile system as either a transmitting unit for scanning an original document and transmitting facsimile signals or as a receiving unit to receive the facsimile signals and produce a copy of the document.

A wide variety of facsimile systems are available for scanning an original document, generating video facsimile signals that correspond to the document and then transmitting the video signals to a remote location. A receiving unit located at a remote location receives the video signals and scans a copy paper so as to produce a facsimile of the original document. Such systems have traditionally employed wideband signals and have required wideband transmission means. In addition, such systems have not only required bulky and expensive equipment that is difficult to use and require skilled operators, but have also required special and expensive transmission means that are not always readily available at all locations.

More recently, facsimile systems have been provided that are very compact and easy to use and may be employed with readily-available low-cost transmission means such as presently available narrow-band telephone transmission lines used for ordinary telephonic conversations. A facsimile system of this type is disclosed and claimed in a copending application entitled "Facsimile Systems," Ser. No. 176,248, filed Feb. 22, 1962, now abandoned, in the names of Glenn A. Reese and Paul J. Crane. This facsimile system employs a transceiver that may be readily transported to and used at any location where a telephone is available.

The transceiver of the above-cited application, Ser. No. 176,248, may be operated as a transmitting unit for scanning an original document such as a letter, drawing, blueprint, etc. The transceiver generates a video signal and acoustically or otherwise couples the video signals into a conventional telephone for transmission on a conventional telephone transmission line. The transceiver may also be operated as a receiving unit for acoustically or otherwise decoupling the video signals from a conventional telephone interconnected with the telephone transmission line. The receiving unit then scans a blank piece of copy paper and produces a facsimile of the original document. Although the foregoing facsimile system and the transceiver therefor have proved effective for producing facsimiles, they have been found to have certain limitations and disadvantages.

The present invention provides a facsimile transceiver that overcomes the foregoing difficulties. More particularly, the present invention provides a facsimile transceiver that is not only easy to use by even an inexperienced person and is simple and inexpensive, but is also very reliable and produces facsimiles of uniform quality.

More particularly, the present invention provides a facsimile transceiver that may operate in either a transmit or receive mode. The transceiver includes a platen that is adapted to have the original document or a copy paper mounted therein. Means are provided to facilitate the insertion of the original document or copy paper into position on the platen for a reproduction and to facilitate the removal of the document or copy paper after a reproduction. Means are also provided for advancing the document or copy paper uniformly through the transceiver during a transmitting or receiving operation. When the transceiver is operating in a transmit mode, pickup transducers scan successive lines across an original document disposed on the platen and produce baseband signals. When the transceiver is operating in the receive mode, the baseband signal energizes printing transducers which are scanning a copy paper positioned on the platen. Means are provided to ensure an accurate positioning of the document or copy paper so that a faithful scanning of the document is assured.

These and other features and advantages of the present invention will become apparent from the following detailed description of a limited number of operative embodiments of the present invention, particularly when taken in connection with the accompanying drawings wherein like reference numerals refer to like parts and wherein.

Figure 1:
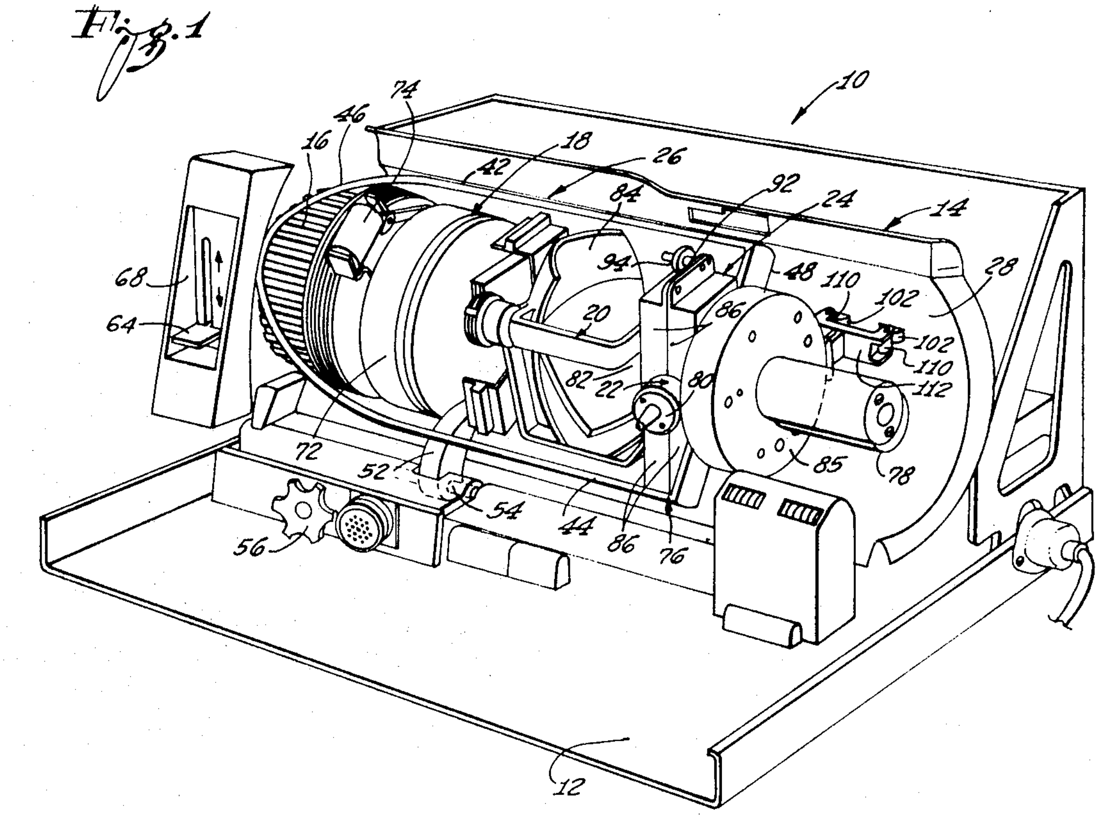
FIGURE 1 is a perspective view of a transceiver embodying one form of the present invention.
Figure 2:
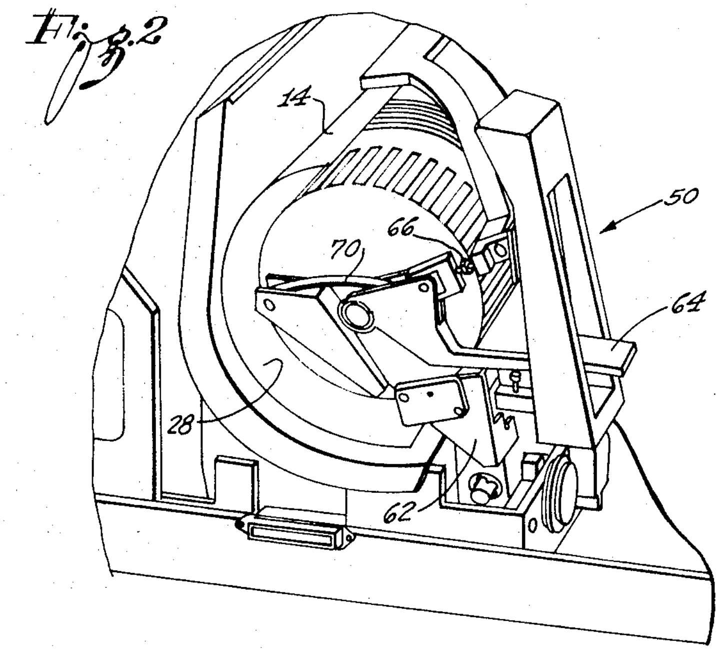
FIGURE 2 is a fragmentary perspective view of an end portion of the transceiver of FIGURE 1.
Figure 3:
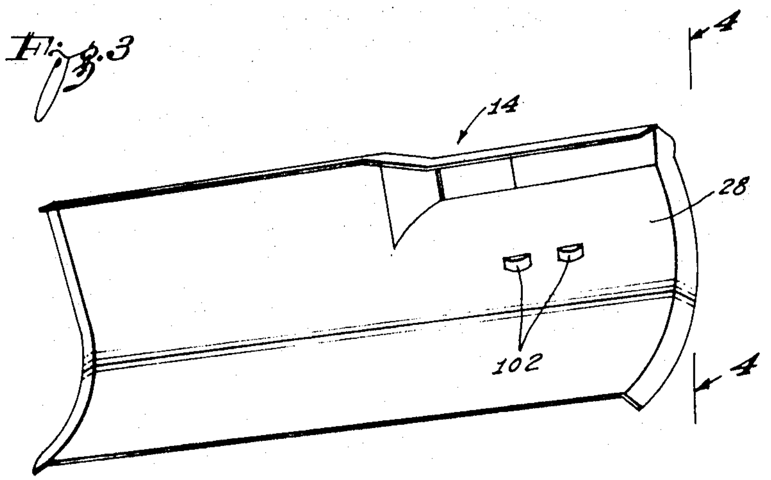
FIGURE 3 is a perspective view of a platen used in the transceiver of FIGURE 1.

Referring to the drawings in more detail and particularly to the embodiment of FIGURE 1, the present invention is adapted to be embodied in a facsimile system for producing facsimiles of documents such as letters, drawings, blueprints, etc. Although the facsimile system may employ any type of transmission line, in the present instance it is particularly adapted for transmitting the facsimile or video signals over a conventional narrow-band telephone transmission line such as are presently commercially available for ordinary telephonic conversation.

The facsimile system employs a transceiver 10 which may be operated from an electrical power supply (not shown in the drawings). The transceiver 10 may be used either in a transmit mode for scanning an original document and then generating and transmitting video or facsimile signals, or alternatively, it may be operated in a receive mode for receiving the video or facsimile signals and reproducing a facsimile of the original document. The transceiver 10 includes a base 12 upon which the various operative elements of the transceiver 10 may be mounted.

A platen 14, mounted on the base 12, extends horizontally thereacross. Various operative elements such as a drive motor 16, a synchronizing clutch 18, a yoke 20, pickup transducers 22 and printing transducers 24 may be mounted on a cradle 26 disposed in front of the platen 14. The motor 16 may be of the synchronous type to operate at precisely controlled speeds. That is to say, the motor 16 may be of the hysteresis-synchronous design whereby it rotates at a speed synchronous with the frequency of power supply signal. In such case the power supply of the motor is also a source of speed-regulating control signals of a very precise nature.

The platen 14 may be fabricated by any suitable means. However, it has been found that the platen 14 can best be made by a sheet metal stamping operation. The inner surface 28 of the platen 14 is preferably arcuate with a substantially semicylindrical shape. A document to be duplicated or a copy paper upon which a facsimile is to be reproduced may be mounted on this surface 28. The surface 28 is preferably sufficiently smooth to permit the document or copy paper to slide easily therealong.

Although the present facsimile system may reproduce any type of document, in the present instance it is particularly adapted to reproduce documents such as letters, drawings, sketches, blueprints, etc. which are of a standard letter size (i.e., approximately 8½ x 11 inches). Accordingly, the platen 14 is of a size suitable for receiving paper of this size.

Figures 5, 6, 7:
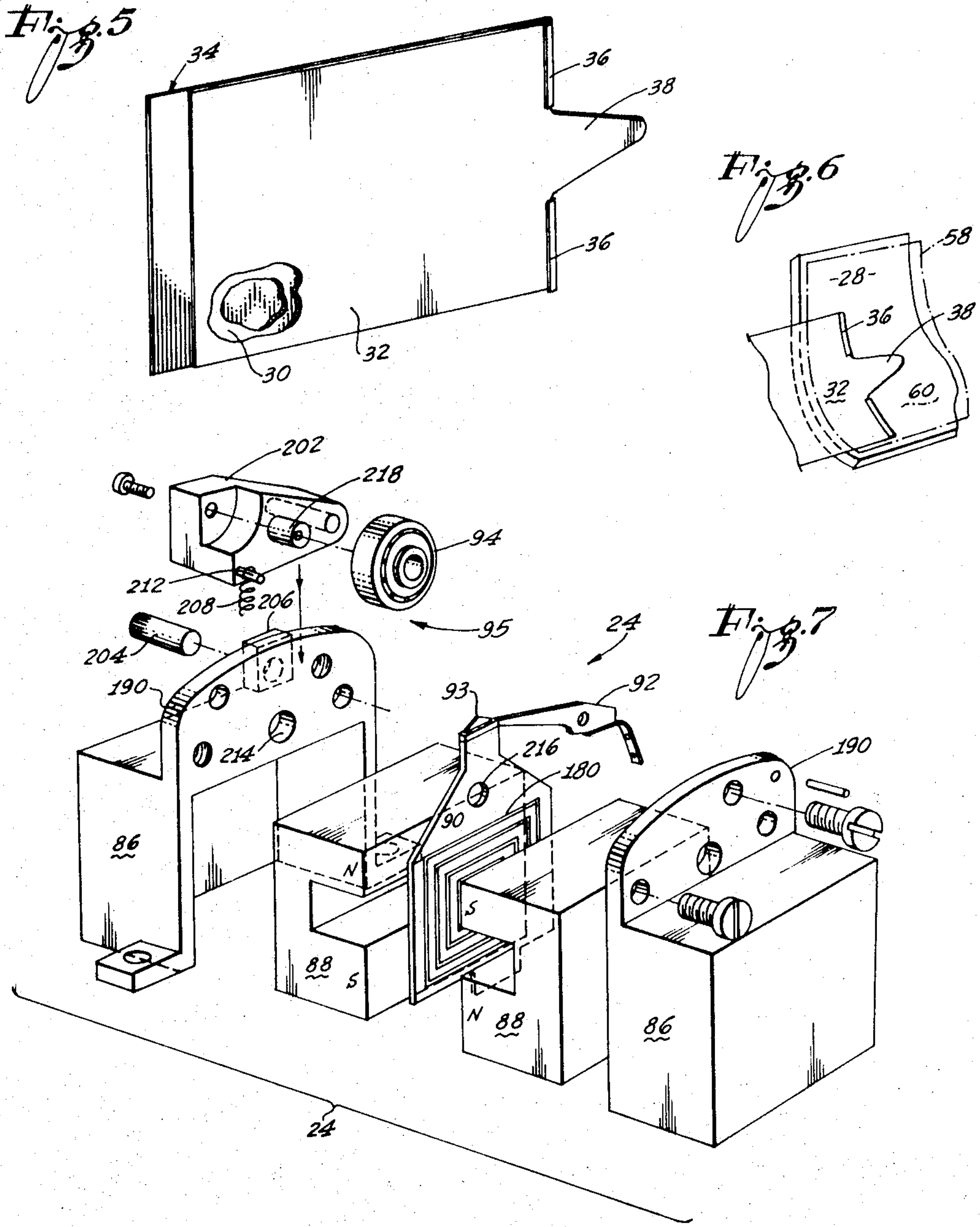
FIGURE 5 is a perspective view of a copy paper and a holder therefor.
FIGURE 6 is a perspective view of the paper and holder of FIGURE 5 on the platen of FIGURE 3.
FIGURE 7 is an exploded view of the printing transducer in the transceiver for printing on the copy paper.

The facsimile may be produced on any type of copy paper. However, in the present instance, the facsimile is in the form of a carbon copy produced on a blank piece of ordinary paper 30 (FIGURE 6). Such a copy is produced by means of the pressure-sensitive writing material such as a sheet of carbon paper 32 overlying the blank paper 30.

In order to facilitate the handling of the combined blank paper 30 and carbon paper 32, a suitable holder 34 may be provided. In the present instance, this holder 34 is fabricated from a flexible material such as a medium plastic (Mylar) film having a width substantial identical to or slightly greater than the widths of the blank paper 30 and carbon paper 32. A pair of tabs 36 may be formed on the leading edge of the holder 34. These tabs 36 are adapted to fold over the leading edges of the blank and carbon papers 30 and 32 and retain two sheets in a fixed position on the holder 34. A tongue 38 is provided on the leading end of the holder 34 to facilitate its handling and initiate feeding through the transceiver.

It will thus be seen that the blank and carbon papers 30 and 32 may be combined into a single unit that is easy to handle. The holder 34 and papers 30 and 32 may be placed on the platen 14 formed into the same arcuate shape. The holder 34 may then be advanced axially along the platen 14 and a facsimile printed onto the blank paper 30 by exerting a pressure against the carbon paper 32 that forces it against the blank paper 30 and platen 14.

Figure 4:
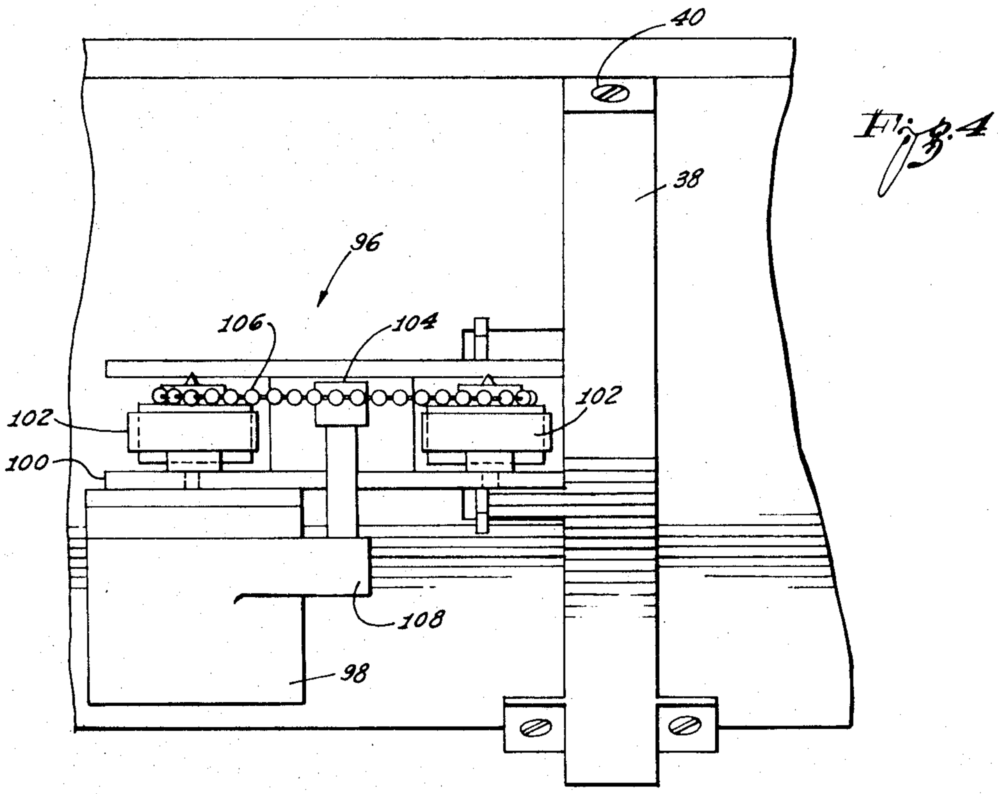
FIGURE 4 is a rear view of the platen of FIGURE 3 and paper drive mounted thereon.

Referring to FIGURE 4, a mounting bracket 38 may be secured to the back of the platen 14 for attaching the platen 14 to the base 12 and for supporting the platen 14 in a fixed position. The bracket 38 includes a semicylindrical surface that fits against the back of the platen 14. Means such as clamps or screws 40 are provided on the bracket 38 for forcing the platen 14 to expand radially outwardly against the cylindrical surface or the bracket 38. This will insure this critical region of the platen 14 being rigidly maintained in a true cylindrical shape corresponding to that on the bracket 38. Thus, even though the platen 14 is a relatively flexible sheet metal stamping, it will have an accurate cylindrical shape in the critical region.

Referring again to FIGURE 1, the cradle 26 includes a pair of substantially parallel sides 42 and 44 that extend substantially parallel to the top and bottom sides of the platen 14. A pair of cross members 46 and 48 extend between the opposite ends of the two sides 42 and 44. One end 46 of the cradle 26 is supported by a paper release mechanism 50 while the center of the cradle 26 is pivotally mounted on the end of an arm 52.

The paper release 50 and the arm 52 are pivotally secured to the base by hinges 54. The cradle 26 may thereby swing between an operative position adjacent the platen 14 and a service position remote from the platen 14. A lock, controlled by the knob 56, is effective to secure the cradle 26 in the operative position or release it.

A paper guide 58 may be secured to the cradle 26 for retaining the document or holder and copy papers on the platen 14. In the present instance, the guide 58 includes a pliable plastic member such as a Mylar sheet 60. This sheet 60 is arranged into a semi-cylindrical shape similar to the surface 28 on the platen 14. When the cradle 26 is in the operative position, the sheet 60 will rest on the surface of the platen 14. Thus, if a piece of paper, such as a document, is in position on the platen 14, it will be formed into the same cylindrical shape. For reasons that will become apparent subsequently, the end of the sheet 60 preferably ends in line with the critical area in the region of the mounting bracket 38.

The paper release 50 controls the position of the cradle 26 and facilitates the insertion and release of the document or paper. The paper release 50 includes a support 62 that is secured to the hinge 54 so as to be free to swing therearound. The lever 64 is pivotally attached to the support 62 while an adjustable member such as the turnbuckle 66 connects the lever 64 to the cradle 26. One end of the lever 64 projects through a slot in a face plate 68 so as to be raised or lowered between two different positions. When the lever 64 is raised, the end 46 of the cradle 26 will be moved toward the platen 14. This will cause the cradle 26 to rotate about the arm 52 and move the pliable sheet 60 in the paper guide 58 away from the platen 14. This will release the document or copy paper and allow it to be moved axially along the platen 14. However, when the lever 64 is moved into the lower position the cradle 26 is pivoted about the arm 52 and the pliable sheet 60 is forced against the platen 14. This in turn will force the document or paper against the platen 14 whereby it may be scanned. An over-center spring 70 retains the lever 64 in either its raised or lowered position until it is manually moved to the other position.

The drive motor 16 is preferably of the so-called synchronous type. Such a motor 16 is of the AC variety and runs at a synchronous speed that is a precise function of only the frequency of the power supplied thereto. Thus, if the power supplied to the transmitting and receiving motors 16 are of the same frequency, the motors 16 will run at identical speeds. This will ensure the pickup and printing transducers 22 and 24 running at precisely identical speeds.

The synchronizing clutch 18 connects the drive motor 16 with the yoke 20 and is effective to vary the phase of the transducers so that the phase of the receiving or printing transducer 24 is synchronized with the phase of the transmitting or pickup transducer 22. Although any desired type of clutch may be employed in the present embodiment, the synchronizing clutch 18 is substantially the same as the clutch disclosed and claimed in copending application, Ser. No. 520,269, filed Jan. 12, 1966 in the names of Glenn A. Reese and Paul J. Crane.

This clutch 18 employs a carrier 72 that is interconnected with the motor 16 by first and second drive paths so as to permit the carrier 72 to run at either a synchronized speed or at a slightly slower speed. A solenoid 74, responsive to synchronizing signals from the transmitting unit, is effective to actuate the clutch 18 and cause either the first or second drive path to be operative.

When the first drive path is operative, the carrier 72 in the clutch 18 will rotate at the slower speed. This will vary the phase relationship between the carriers 72 in the transmitting and receiving units. When the phase of the carrier 72 in the receiving unit matches the phase of the carrier 72 in the transmitting unit, the second drive path becomes operative whereby the receiving carrier 72 is then driven at the synchronous speed.

The yoke 20 has one end connected directly with the carrier 72 and rotates therewith at the same speed. The opposite end of the yoke 20 forms a turntable 76. The pickup transducers 22 and the printing transducers 24 may be mounted on the yoke 20 and/or turntable 76 so as to rotate therewith.

Although any desired number of and any desired types of transducers may be employed, in the present instance, there are a pair of pickup transducers 22 and a pair of printing transducers 24 for scanning the material on the platen. By employing pairs of transducers, the platen 14 may subtend an arc on the order of 180° or less. This will make the operative elements readily accessible. However, at the same time, the backstroke or dead time between the successive scans will be very short.

Although any desired type of pickup transducer 22 may be employed, in the present instance, the transducer 22 is of the photoelectric variety and may employ an optical system similar to that disclosed and claimed in copending application, Ser. No. 436,504 filed Mar. 2, 1965, now abandoned in the names of Glenn A. Reese and Gustavus B. Pearson. More particularly, this system employs a photoelectric cell which is mounted inside a container 78 attached to the end of the cradle 26. Lens housings 80 are provided on the diametrically opposite sides of the turntable 76. Lenses are disposed in the housings 80 whereby their fields of view are focused on the document contained on the platen 14.

In order to provide a large amount of light for facilitating the scanning, a bulb 82 is mounted on the axis of rotation. The large volume of light from the lamp 82 shines on focusing means such as the semiparabolic mirrors 84. These mirrors 84 focus or concentrate the light from the bulb 82 into two bright spots. These bright spots are positioned to travel across the document in direct alignment with the field of view of the lenses at 80.

The photoelectric cell at 78 responds to the amount of light reflected from the document and produces an electrical baseband signal. It has been found that the signal produced by the photoelectric cell (or photocell) is normally of a very low frequency and very low amplitude. To facilitate the amplification of this signal a shutter wheel may be disposed in the housing 85 so as to periodically interrupt the light before it reaches the photocell. This will provide an AC signal that may be easily amplified and then filtered and/or rectified to provide a stronger baseband signal.

This AC or baseband signal may then be transmitted to the receiver. In the present instance, this is accomplished by means of a frequency modulation system similar to that disclosed and claimed in the copending application, Ser. No. 458,984 filed May 26, 1965, now abandoned in the names of Rex J. Crookshanks and Glenn A. Reese. The baseband signal is frequency modulated and coupled onto a conventional telephone transmission line.

The transmitted signals are decoupled from the telephone lines by a transceiver operating in the receive mode. In the present instance, the transceiver includes a frequency demodulating system similar to that in said application, Ser. No. 458,954. This system demodulates the carrier and recovers the baseband signal. The baseband signal is then supplied to the printing transducer 24 for printing on the copy paper.

The printing transducers 24 may be of any desired variety capable of printing on the copy paper in response to the baseband signals. The present printing transducers 24 are substantially identical to those disclosed and claimed in copending applications, Ser. No. 176,248 filed Feb. 28, 1962, in the names of Glenn A. Reese and Paul J. Crane, and Ser. No. 435,651 filed Feb. 26, 1965, now U.S. Patent 3,325,821 in the names of Glenn A. Reese and Donald H. Westermeier.

Referring to FIGURE 7, each of the printing transducers 24 include a pair of housing members 86 that are secured to the end of the yoke 20. A pair of permanent magnets 88 are mounted inside of the housing members 86 so as to be separated from each other by a relatively narrow air gap.

An armature 90 in the form of a thin card is slidably disposed in the air gap for moving thereacross in response to the baseband signal.

A stylus 92 is pivotally mounted on the housing members 86 so as to engage the armature 90. The apex or contact point 93 of the stylus 92 is positioned to ride on the surface of the carbon paper 32 as the yoke 20 rotates. As the stylus 92 scans across the carbon paper 32, the baseband signal will cause the armature 90 to produce varying amounts of pressure on the stylus 92 whereby the carbon paper 32 will print on the blank paper 30.

It has been found desirable to control the amount of clearance between the stylus 92 and the copy paper. In the present instance, this is accomplished by, among other things, forming a true cylindrical surface on the bracket 38 and positioning it accurately concentric with the axis of rotation of the yoke 20. The platen 14 is then expanded radially outwardly against the bracket 38 to insure the surface 28 of the platen 14 having a truly cylindrical shape. Also, the pliable sheet 60 in the paper guide 58 compresses the carbon paper 32, blank paper 30 and holder 34 firmly against the platen 14 to insure their being maintained in the true cylindrical shape with a minimum amount of clearance between them.

The position of the stylus 92 is also controlled by means of a guide roller 94 that travels on the end of the pliable sheet 60. Since the sheet 60 is of uniform thickness, the roller 94 will be accurately positioned relative to the carbon paper 32. The roller 94 is connected to the armature 90 by a lost motion connection 95 to be described in greater detail hereinafter. This connection maintains the armature 90 accurately positioned with respect to the roller 94 and therefore with respect to the carbon paper 32. However, the lost motion permits the armature 90 to travel through a sufficient distance to actuate the stylus 92 over a range that will insure a printing on the paper 30 by the carbon paper 32.

In order to scan the paper 30 and/or the document, a suitable paper feed 96 (FIGURE 4) may be provided for advancing the document or copy paper axially along the platen 14 as the pickup transducers 22 and/or printing transducers 24 travel transversely across the platen 14. Although this paper feed may be of any desired variety, in the present instance it is mounted on the back of the platen 14 so as to continuously advance the document and/or paper at a substantially uniform rate.

More particularly, the paper feed 96 includes an electric drive motor 98 which is secured to the mounting bracket 38 by means of a motor mounting 100. Although the motor 98 may be of any desired variety, it has been found desirable to employ a so-called synchronous motor which is effective to run at a predetermined speed dependent upon the frequency of the power supply thereto. The motor 98 may be driven from the frequency controlled power supply that drives the primary motor 16. However, it has been found that the motor 98 may be driven from a conventional 60-cycle power supply normally available throughout the country. The variations in the frequency of such power are of a minor magnitude that they will not produce a noticeable distortion in the vertical scan rate.

A pair of drive rollers 102 are mounted on the motor mounting 100. The periphery of the rollers 102 project through openings in the platen 14. The rollers 102 project just a sufficient distance beyond the surface 28 of the platen 14 to insure an intimate contact with the document or the holder 34 for the copy paper.

The two drive rollers 102 are interconnected with the motor 98 by means of a pulley 104 and a flexible drive such as a ball chain 106. Suitable speed reducing means 108 are provided so that the peripheral velocity of the rollers 102 will be identical with the desired axial velocity of the document and/or copy paper. More particularly, the document or copy paper is advanced a distance equal to the width of a line scanned by the pickup and printing transducers 22 and 24 each half rotation of the yoke 20.

It has been found desirable to employ a suitable pressure means for maintaining the document and/or copy paper compressed against the drive rollers 102. In the present instance, this is accomplished by a pair of rollers 110. The rollers 110 are mounted on a pressure member 112 attached to the cradle 26. When the lever 64 in the paper release 50 is moved to the raised position, the cradle 26 pivots on the arm 52 and moves the pressure member 112 away from the platen 14. This produces a limited clearance space between the pressure rollers 110 and the drive rollers 102. As a consequence, it will be possible for the leading edge of the document and/or copy paper to be inserted between the two sets of rollers 102 and 110. When the lever 64 is moved to the lowered position, the paper release 50 will force the cradle 26 towards the platen 14 and compress the pressure rollers 110 against the drive rollers 102. If the leading edge of the document and/or copy paper is previously positioned between these rollers 102 and 110, sufficient friction will be produced to insure their cooperating with each other to drive the document and/or copy paper therethrough.

In order to use the present facsimile system, a first transceiver is adjusted to operate in a transmit mode while a second transceiver is adjusted to operate in the receive mode. To do this, the levers 64 in the two units are moved to their raised positions. This will cause the cradles 26 to swing about the end of the arm 52 and away from the platen 14. The sheet 60 in the paper guide 58 will separate from the platen 14 and the pressure rollers 110 will separate from the drive rollers 102. The document and the copy paper may then be placed on the platen 14 and advanced axially therealong until the leading edges are disposed between the drive rollers 102 and the pressure rollers 110. The levers 64 are then moved to their lowered position so as to force the cradles 26 towards the platen 14. When this occurs, the pliable sheet 60 in the paper guide 58 will compress the document and/or copy paper against the platen 14. Also, the pressure rollers 110 will compress the document and/or copy paper against the drive rollers 102 with a sufficient force to insure a positive frictional drive therebetween.

After the transmitting unit and receiving unit have been properly coupled together by a suitable transmission line such as a commercially available telephone line, the two units are energized. Initially, both of the units will pass through a synchronizing interval. During this interval, the synchronizing clutch 18 will adjust the phase of the printing transducers 24 so as to cause them to be in phase with the pickup transducers 24. After the printing and pickup transducers 22 and 24 in the receiving and transmitting units have been properly synchronized with each other, the motors 98 in the two paper drives 96 will be energized so that the document in the transmitting unit and the holder containing the copy paper in the receiving unit will be simultaneously advanced axially along the platen 14. Since the drive motors 98 operate at identical speeds, the document and copy paper will advance axially synchronously with each other.

The pickup transducers 22 in the transmitting unit will optically scan a narrow line on the document immediately adjacent to the end of the sheet 60. This line will have a width which is substantially identical to the width of the apex on the stylus 92.

The pickup transducer 22 will respond to the amount of light reflected from the document and produce a baseband signal. The baseband signal will then be frequency modulated onto a carrier and transmitted over the transmission line to the receiving unit. The carrier will then be demodulated to provide a baseband signal. This baseband signal will then be circulated through the armature 90 on the operative printing transducer 24. The apex of the stylus 92 which is riding across the surface of the carbon paper 32 in synchronism with the pickup transducer 22 exerts a pressure against the carbon paper 32. The magnitude of this pressure will be a function of the magnitude of the baseband signal circulated through the printed circuit on the armature 90. It will thus be seen that the amount of pressure applied to the carbon paper 32 will be a function of the reflectivity of the original document whereby a facsimile of the original document will be faithfully reproduced upon the paper 30.

As the pickup transducer 22 and the printing transducer 24 travel across the document or copy paper, the drive motors 98 advance the document or copy paper. The amount of these advances are identical and equal to the width of a line scanned by the transducers 22 and 24. It will thus be seen that the document and copy paper will simultaneously be advanced and scanned. As a result, a faithful reproduction of the original document will be produced on the copy paper 30.

As another feature of the paper positioning and feeding principles of the instant invention, the printing transducers disclosed in the above-cited Serial No. 176,248 and Serial No. 435,651 are mechanically biased into position, whereas originally a biasing current was circulated in the armature 90 so as to maintain the stylus point 93 in contact with the paper 30 or carbon 32. Unfortunately, in order to do an advantageous job, the force had to be so large that lines were drawn onto the copy. Also, at the termination of a mark, the stylus tends to bounce from the position where the stylus produces marks on the copy. Referring to FIGURE 7, in the present transducer a roller 94 is provided so as to roll across the end of the sheet 34. The stylus 92 runs on the paper immediately adjacent to the end of the sheet 34. The roller 94 is connected with the armature 90 by means of a pin 204 which allows the armature 90 to float onto the pin 204 with the freedom of about 0.005 inch. About 0.002 inch travel is required for the printing operation. The mounting pin 204 is arranged for ease of assembly and disassembly. The stylus 92 is constructed to form a line contact on the paper 30 for higher resolution, i.e. lines of uniform width and sharp beginnings and endings. The armature 90 rotates or swings about the pin 204. It will be seen that the flexible sheet 34 cooperates with the sheet 58 and the rollers 110 to maintain the sheet of paper 30 against the cylindrical surface 28 of the platen 14 and also mechanically positions the armature 90 so that the stylus 92 is always within 0.005 inch of the paper 30.

The use of the rollers 94 on the two transducers of the transceiver of Ser. No. 176,248 is effective to standardize the characteristics of the transducers. More particularly, the amount of pressure of the stylus 92 and the time delay will always be the same for both of the printing transducers. This will cause the beginning and ending of a mark to occur at the appropriate time whereby jitter or ragged edges on the vertical line will be eliminated.

The spacing means of FIGURE 7 controls the position of the apex or contact point 93 of the stylus 92 relative to the carbon paper 32 to thereby provide a uniform printing characteristic. The end of the pliable sheet 34 terminates immediately adjacent to the scan area where the printing operation is performed. A follower system 95 may then be provided that travels on the pliable sheet immediately adjacent the end of the sheet and, therefore, the scan area. The follower 95 is operatively interconnected with the stylus 92 and controls the position of the stylus 92 relative to the copy paper 30, in addition to creating some compression force on the pliable sheet 34.

In the present instance, this follower 95 includes an arm 202 which is mounted on a pin 204 which extends between the armature 90 and the lug 206 so as to allow the arm 202 to rotate thereabout. A compression spring 208 is provided between the arm 202 and the housing 86 to bias the arm 202 radially outwardly. Although the arm 202 may ride directly on the sheet 34, it has been found desirable to provide the roller 94 that travels on the surface of the pliable sheet 34. Since the roller 94 is in direct contact with the back of the pliable sheet 34, it will be seen that the arm 202 will be accurately positioned relative to the pliable sheet 34 and also to the carbon paper 32 and to the blank paper 30 underneath.

The arm 202 is interconnected with the armature 90 by means of a pin 212 which projects through an enlarged opening 214 in the flange 190 on the housing 86. This opening 214 is large enough to prevent the pin 212 from engaging the flange 190 during normal operation. However, it will limit the amount of travel of the arm 202 when the roller 94 does not engage the pliable sheet 34.

The pin 212 also projects into an enlarged opening 216 in the armature 90. This opening 216 is large enough to permit the armature 90 to move relative to the pin 212 by an amount that is adequate to permit printing or not printing through the carbon paper 32. By way of example, this clearance may be on the order of about 0.005 inch.

During a printing operation, the yoke 20 will be rotating and the baseband signal will be supplied to the coil 180 on the armature 90. When one of the transducers 24 swings into position to print on the copy paper 30, the roller 94 will begin to roll along the pliable sheet 34. This will cause the armature 90 and the stylus 92 to be accurately positioned at a uniform distance relative to the carbon paper 32 and platen 14. If a uniform distance is maintained between the stylus 92 and the carbon paper 32, the distance of travel and striking force of the stylus 92 will be similarly uniform. The arm 202 will then move the armature 90 in and out corresponding to these variations and maintain the stylus 92 accurately positioned relative to the carbon paper 32. However, the clearance space around the pin 212 will provide enough lost motion to permit the stylus 92 to print through the carbon paper 32.

In order to permit an adjustment of the amount of clearance, the roller 94 may be mounted on an eccentric 218. By rotating this eccentric 218, the rollers 94 in the two transducers may be moved relative to the arms 202 and vary the positions of the arms 202 relative to the sheet 34. This in turn will be effective to cause the armatures 90 to also be moved relative to the sheet 34 whereby the clearance spaces in the two transducers may be equal to each other.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

We claim as our invention:

1. In combination in a device for marking on copy material, first means for holding the copy material, scanning means positioned adjacent the first means, a guide roller mounted on the scanning means in such position to be urged against the copy material as the scanning means is operated, marking means mounted on the scanning means, second means for causing the marking means to mark on the copy material, third means mechanically connected between the guide roller and the marking means for causing the marking means to mark with uniform force on the copy material from the scanning means, a first roller positioned on one side of the first means to engage the copy material and rotatable in a direction for advancing the copy material in a direction transverse to the direction of scan, and a second roller positioned on the opposite side of the first means from the first roller and extending through the first means to engage the copy material and rotatable in cooperation with the first roller to advance the copy material in the transverse direction.

2. In combination in a facsimile transceiver set for marking facsimiles on copy paper, an arcuate platen for holding the copy paper, a flexible paper holder disposed relative to the platen for forcing the copy paper to conform to the shape of the arcuate platen, a rotary scanning drum positioned adjacent the arcuate platen, a guide roller arm mounted on the rotary scanning drum in such position to be urged toward the flexible paper holder as the rotary scanning drum is operated, a guide roller mounted on the guide roller arm in position to roll along the flexible paper holder as the scanning drum is operated, a stylus mounted on the rotary scanning drum, means for causing the stylus to mark on the copy paper, a pin mounted on the guide roller arm and loosely connected to the stylus for causing the stylus to mark with uniform force on the copy paper regardless of the varying distance of the copy paper from the rotary scanning drum, a first roller positioned on one side of the paper holder to engage the copy paper and rotatable in a direction transverse to the rotary direction of the scanning drum to advance the copy paper, and a second roller positioned on the other side of the paper holder from the first roller and extending through the platen to engage the copy paper and rotatable in the transverse direction in cooperative relationship with the first roller to advance the copy paper in the transverse direction.

3. In combination in a facsimile transceiver set for marking facsimiles on copy paper, an arcuate platen for holding the copy paper, a flexible paper holder disposed relative to the platen for forcing the copy paper to conform to the shape of the arcuate platen, a rotary scanning drum positioned adjacent the arcuate platen, a guide roller mounted on the rotary scanning drum in position to be urged against the flexible paper holder as the rotary scanning drum is operated, a stylus mounted rotatably on the rotary scanning drum, first means for causing the stylus to mark on the copy paper, second means mechanically connected between the guide roller and the stylus for causing the stylus to mark with uniform force on the copy paper regardless of the varying distance of the copy paper from the rotary scanning drum, a first roller disposed on one side of the paper holder and rotatable in a direction transverse to the direction of rotation of the drum to move the copy paper in the transverse direction, and a second roller disposed on the opposite side of the paper from the first roller and extending through the platen and rotatable in the transverse direction in cooperative relationship with the first roller to move the copy paper in the transverse direction.

4. In combination for use with a copy paper, rotary transducer means rotatable on a particular axis of rotation and including means for providing a recording on the copy paper,
a platen having a holding surface against which the copy paper is held, said holding surface being arcuate and coaxial with the axis of rotation of the rotary transducer,
flexible means for holding the copy paper against the platen so that the copy paper assumes the arcuate shape of the holding surface of the platen,
means associated with the rotary transducer means and constructed to press against the copy paper on the platen and to vary the disposition of the rotary transducer means relative to the platen to provide for the maintenance of a substantially uniform relationship between the rotary transducer means and the flexible material,
a first roller disposed on one side of the copy paper and rotatable on an axis substantially perpendicular to the axis of rotation of the rotary transducer means, and
a second roller disposed on the opposite side of the copy paper from the first roller and extending through the platen and rotatable on an axis substantially perpendicular to the axis of rotation of the rotary transducer and in cooperative relationship with the first roller to obtain a movement of the copy paper in the axial direction.

5. In combination for use with a copy paper,
a rotary transducer rotatable on a particular axis and including means for recording information on the copy paper,
a platen having a holding surface against which the copy paper is held, said holding surface being arcuate and coaxial with the axis of rotation of the rotary transducer,
flexible means for holding the copy paper against the platen so that the copy paper assumes the arcuate shape of the holding surface of the platen,
guide means associated with the rotary transducer and constructed to press against the copy paper and the platen and to vary the disposition of the rotary transducer relative to the copy paper for maintaining the disposition of the rotary transducer relative to the copy paper substantially uniform,
first roller means disposed on one side of the copy paper and rotatable on an axis substantially perpendicular to the axis of rotation of the rotary transducer,
second roller means disposed on the opposite side of the copy paper from the first roller means and extending through the platen and rotatable on an axis substantially perpendicular to the axis of rotation of the rotary transducer and in cooperative relationship with the first roller means to drive the copy paper in the axial direction, and
means for moving the rotary transducer between a first position for the disposition of the copy paper on the platen or the removal of the copy paper from the platen and a second position for obtaining a recording of information on the copy paper.

6. In combination for use with a copy paper,
a rotary scanning transducer,
a flexible material adjacent thereto for holding the copy paper,
means defining a holding surface against which the flexible material is held, said holding surface being arcuate and coaxial with the axis of rotation of the rotary member,
means disposed relative to the copy paper for holding the copy paper against the holding surface so that the copy paper assumes the arcuate shape of the holding surface,
guide roller means associated with the scanning transducer and constructed to press against the copy paper and to move the scanning transducer forward and backward to maintain a uniform distance between the copy paper and the scanning transducer,
a first roller disposed on one side of the copy paper and rotatable in a direction substantially parallel to the axis of rotation of the rotary transducer, and
a second roller disposed on the opposite side of the copy paper from the first roller and extending through the platen and rotatable in the direction substantially parallel to the first roller and in cooperative relationship with the first roller to move the copy paper in the direction substantially parallel to the axis of rotation of the rotary transducer.

7. In combination for use with a copy paper,
rotary means for providing a recording of information on the copy paper at first particular times and a reproduction of information from the copy paper at second particular times, the rotary means having a particular axis of rotation,
a base,
an arcuate platen mounted on the base and having substantially the particular axis,
a pliable member mounted adjacent the arcuate platen to hold the copy paper against the surface of the platen,
a hinge mounted on the base and attached to the rotary means to provide for a movement of the rotary means between first and second positions where the rotary means is disposed in contiguous relation to the copy paper on the platen in the first position and is displaced from the platen in the second position to provide for access to the platen,
means operatively coupled to the rotary means for obtaining a movement of the rotary means between the first position and the second position,
means for forcing the rotary means to maintain either its first position or its second position until positively moved to the other of its two positions,
first roller means disposed on one side of the copy paper and rotatable on an axis substantially perpendicular to the particular axis, and
second roller means disposed on the opposite side of the copy paper from the first side and extending through the platen and rotatable on an axis substantially perpendicular to the particular axis and cooperative with the first roller means to move the copy paper in the axial direction.

8. In combination for use with a copy paper,
rotary means for providing a reproduction of information from the copy paper at first particular times and a recording of information on the copy paper at second particular times different from the first particular times, the rotary means being rotatable on a particular axis,
a base,
an arcuate platen mounted on the base and having substantially the particular axis,
a pliable member mounted adjacent the arcuate platen to hold the copy paper against the surface of the platen,
a hinge mounted on the base and attached to the rotary means to provide for a displacement of the rotary means between a first position in contiguous relationship to the copy paper and a second position displaced from the copy paper to provide for access to the copy paper,
means operatively coupled to the rotary means for obtaining a displacement of the rotary means between the first position and the second position,
first roller means disposed on one side of the copy paper and rotatable on an axis substantially perpendicular to the particular axis, and
second roller means disposed on the opposite side of the copy paper from the first side and extending through the platen and rotatable on an axis substantially perpendicular to the particular axis and cooperative with the first roller means to move the copy paper in the axial direction.

9. In combination for use with a copy paper, rotary means having a particular axis of rotation and providing a recording of information on the copy paper at first particular times and a reproduction of information from the copy paper at second particular times, a base, an arcuate platen mounted on the base and having substantially the particular axis, a pliable member mounted adjacent to the arcuate platen to hold the copy paper against the platen, a hinge mounted on the base and attached to the rotary means to provide a hinged relation between the rotary means and the base for a movement of the rotary means between a first position contiguous to the copy paper and a second position displaced from the copy paper to provide for access to the platen in the second position, a lever mounted pivotally on the rotary means for movement between first and second positions, a connecting member mounted pivotally relative to the lever and to the base to obtain a rotation of the rotary means between the first and second positions in accordance with the movement of the lever between the first and second positions and including means for adjusting the length of the connecting member to adjust the first position of the rotary means relative to the copy paper on the platen, means operatively coupled to the lever for forcing the lever to maintain either its first position or its second position until moved positively to the other of its two positions, first roller means disposed on one side of the copy paper and rotatable on an axis substantially perpendicular to the particular axis, and second roller means disposed on a second side of the copy paper opposite to the first side and extending through the platen and rotatable on an axis substantially perpendicular to the particular axis to move the copy paper in the axial direction.

10. In combination for use with a copy paper, rotary means for providing a recording of information on the copy paper at first particular times and a reproduction of information from the copy paper at second particular times, the rotary means having a particular axis of rotation, a base, an arcuate platen mounted on the base and having the particular axis, a pliable member mounted adjacent the arcuate platen to hold the copy paper against the platen, a hinge mounted on the base and attached to the rotary means to provide for a movement of the rotary means between a first position in contiguous relationship to the pliable member on the platen and a second position displaced from the pliable member on the platen to provide for access of the copy member on the platen in the second position, a lever mounted pivotally on the rotary means for movement between first and second positions, a connecting member mounted pivotally relative to the lever and to the base to provide for movement of the rotary means between the first and second positions in accordance with movements of the lever between the first and second positions and including means for adjusting the length of the connecting member to adjust the first position of the rotary means relative to the copy paper on the platen, means operatively coupled to the lever for forcing the lever to maintain either the first position or the second position until moved positively to the other of the two positions, a motor, drive roller means mounted to protrude through the arcuate platen to make contact with the copy paper on one side of the copy paper, said drive roller means being connected to the motor and to be driven by the motor and being provided with an axis of rotation substantially perpendicular to the particular axis, pressure roller means mounted in proximity to the drive roller means on the opposite side of the copy paper from the drive roller means to compress between the drive roller and the pressure roller the copy paper being fed along the holding surface and to prevent slippage between the copy paper and the drive roller means, the pressure roller means being provided with an axis of rotation substantially perpendicular to the particular axis, and guide roller means associated with the rotary means to press against the pliable material and the platen to ensure that the copy paper is pressed against the platen.

11. In combination in a facsimile transceiver set for marking facsimiles on copy paper, a base, a semi-cylindrical platen having a holding surface for holding the copy paper mounted on the base, a flexible paper holder for forcing the copy paper to conform to the shape of the holding surface of the semi-cylindrical platen, a rotary scanning drum positioned adjacent the semi-cylindrical platen, a guide roller arm mounted on the rotary scanning drum in such position as to be urged toward the flexible paper holder as the rotary scanning drum is operated, a guide roller mounted on the guide roller arm in such position as to roll along the flexible paper holder as the scanning drum is operated, a stylus mounted rotatably on the rotary scanning drum, means for causing the stylus to mark on the copy paper, a pin mounted on the guide roller arm and loosely connected to the stylus for causing the stylus to mark with uniform force on the copy paper regardless of the varying distance of the copy paper from the rotary scanning drum, a hinge mounted on the base to carry the rotary scanning drum in hinged relation to the base, a lever mounted pivotally relative to the hinge to pivot the rotary scanning drum, a connecting member mounted pivotally relative to the lever and to the base such that movement of the lever will rotate the rotary scanning drum and including means for adjusting the length of the connecting member such that in a first position of the lever the rotary scanning drum is moved to a precise position relatively close to the copy paper on the platen while in a second position of the lever the rotary scanning drum is moved away from the platen to permit access to the platen, means for forcing the lever to maintain either its first position or its second position until moved to the other of its two positions, a motor mounted on the base, a drive roller mounted to protrude through the semi-cylindrical platen to make contact with the copy paper, said drive roller being mechanically connected to be driven by the motor, and a pressure roller mounted in proximity to the drive roller to compress the copy paper between the drive roller and the pressure roller to prevent slippage between the copy paper and the drive roller.

References Cited

UNITED STATES PATENTS

| | | | |
|---|---|---|---|
| 2,443,953 | 6/1948 | Gillespie | 178—6.6 |
| 2,903,510 | 9/1959 | Elliott | 178—6.6 |
| 3,011,152 | 11/1961 | Eckdahl | 340—146.3 |
| 3,064,077 | 11/1962 | Cary | 178—7.6 |
| 3,199,864 | 8/1965 | Irvine | 271—51 |
| 3,375,528 | 3/1968 | Klavsons | 178—8 |

ROBERT L. GRIFFIN, Primary Examiner

J. A. ORSINO, Jr., Assistant Examiner

U.S. Cl. X.R.

178—7.1, 7.3, 7.6